Figure 1:
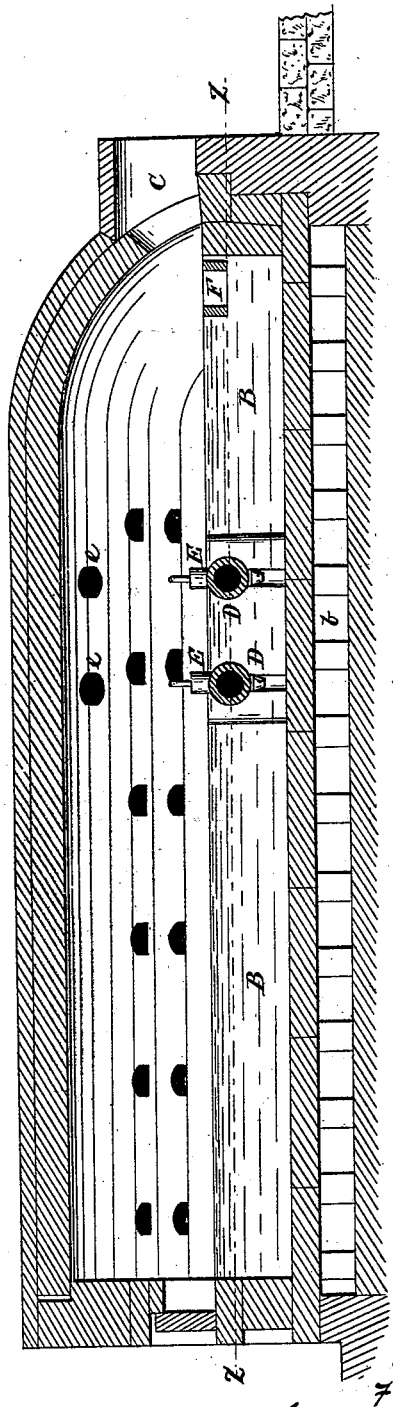

(No Model.) 3 Sheets—Sheet 1.

C. W. & F. SIEMENS.
Furnace for Melting, Refining and Working out Glass.

No. 233,566. Patented Oct. 19, 1880.

Witnesses:
M. M. Bastiphy
M. M. Johnson

Inventor:
C. W. Siemens
F. Siemens
by L. S. Whitman Atty (No Model.) 3 Sheets—Sheet 2.
C. W. & F. SIEMENS.
Furnace for Melting, Refining and Working out Glass.
No. 233,566. Patented Oct. 19, 1880.
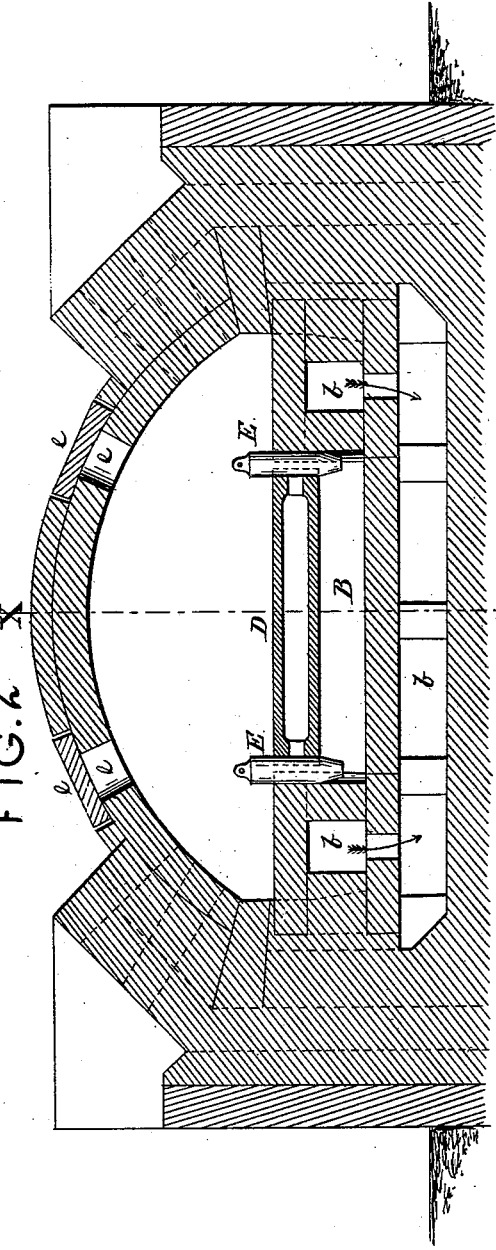
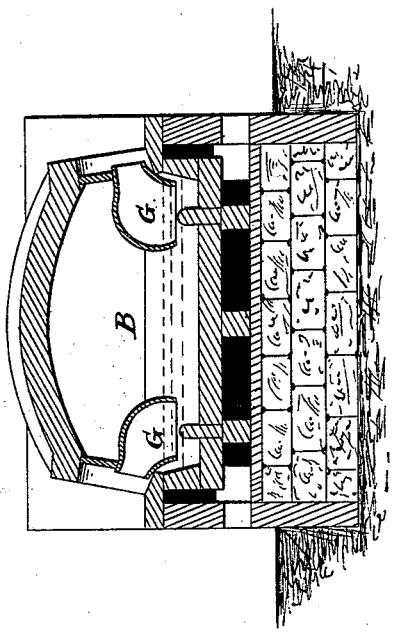

(No Model.) 3 Sheets—Sheet 3.
C. W. & F. SIEMENS.
Furnace for Melting, Refining and Working out Glass.
No. 233,566. Patented Oct. 19, 1880.
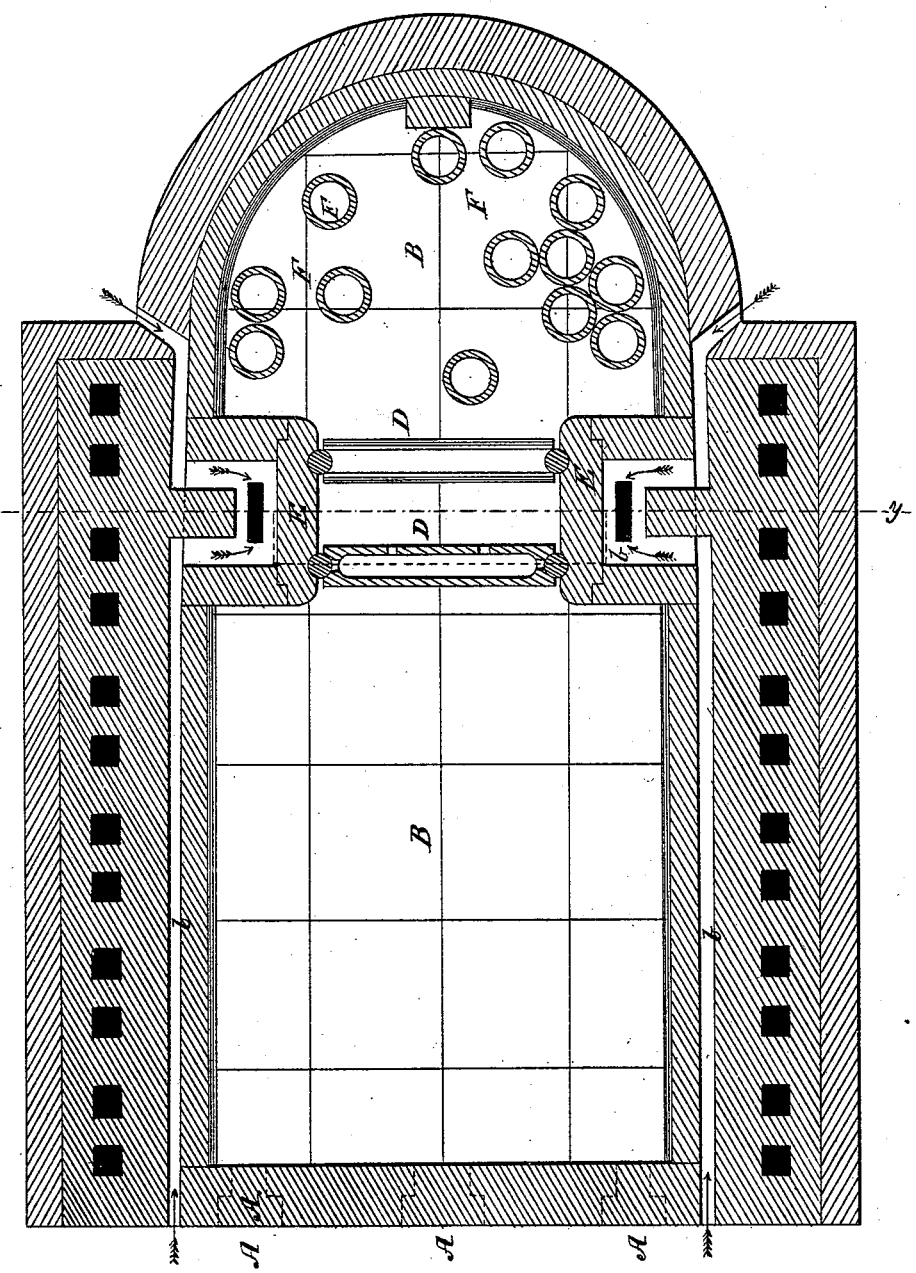

UNITED STATES PATENT OFFICE.

CHARLES WILLIAM SIEMENS, OF WESTMINSTER, ENGLAND, AND FREDERICK SIEMENS, OF DRESDEN, GERMANY.

FURNACE FOR MELTING, REFINING, AND WORKING OUT GLASS.

SPECIFICATION forming part of Letters Patent No. 233,566, dated October 19, 1880.

Application filed June 14, 1880. (No model.) Patented in England November 21, 1872.

*To all whom it may concern:*

Be it known that we, CHARLES WILLIAM SIEMENS, of Westminster, in the county of Middlesex, England, and FREDERICK SIEMENS, of Dresden, in the German Empire, have invented a new and useful Improvement in Furnaces for Melting, Refining, and Working Out Glass, (for which Charles William Siemens obtained a patent in Great Britain, No. 3,478, bearing date November 21, 1872,) of which the following is a specification.

In the melting and working out of glass it is of importance that the operation should be carried on in a continuous manner, crude materials being supplied at the one end of the melting-tank and the refined glass being worked out at the other end. The glass, as it becomes melted, sinks toward the bottom of the tank, where it is purest, the less pure and imperfectly melted and incorporated portion floating above. It is therefore advantageous to prevent the passage of these lighter matters toward the working-out end of the tank, and in working out the glass to draw it from a low level.

This invention relates to the arrangement and construction of bridges and to the use of floating rings for glass-melting tanks in such a manner as to insure the working out of only the most thoroughly-melted and purest portion of the material. For this purpose bars or girders of fire-clay or other refractory material are floated on the surface of the molten matter in the tank and placed therein transversely at intervals, so that they form floating bridges, dividing the upper stratum of the molten matter into compartments. The imperfectly-melted or impure material is thus kept at the supply end of the tank, and only the more thoroughly-melted and pure matter is permitted to flow toward the working-out end by passing downward and under these floating bridges.

The bridges may be secured at different parts of the tank in the following manner: Each of the bars or girders forming a bridge is made with a hollow nearly semicircular or V-shaped at each of its ends, and corresponding hollows are formed at each side of the tank at the points where it is desired that the bridges should be placed. When a bridge is floated to this position, presenting the hollows in its ends to face the hollows in the sides of the tank, cylindrical, conical, or prismatic pieces of fire-clay or other refractory material are let down from above through apertures in the roof of the furnace into the spaces offered by these hollows, and these pieces floating on the molten fluid serve as keys or dowels, which retain the bridge in position.

In order to assist the vertical circulation of the molten matter, floating rings of refractory material in greater number than required for gathering the glass may be employed at the working-out end of the tank, and from these rings, near each working-hole, the glass to be worked should be gathered. As these rings gradually dissolve or wear away they are replaced by fresh rings, which may be introduced as frequently as necessary.

The floating bridges, with their keys or dowels, being made and placed separate from the structure of the tank itself, may, if desired, be readily removed when worn out, and replaced by fresh ones. One or more of such bridges and floating rings may be used, either separately or in conjunction in the same tank, which, by preference, is worked on the principle of a regenerative gas-furnace.

In the accompanying drawings, Figure 1 is a longitudinal section, Fig. 2 a transverse section, and Fig. 3 a sectional plan, of a furnace for melting glass constructed according to our invention.

At one end of the furnace are the doors A A for feeding the material to be fused in the tank B, and at the opposite end are the working-out doors, one of which is shown at C. The sides and bottom of the tank are kept cool by air-flues $b\ b$, which lead to the chimney, the draft of which causes a current of cool air to flow through them. In an intermediate position between the feeding and working-out end of the tank are placed bridges of refractory material, D D, which may be rectangular or other shaped bars of fire-brick; or, as is shown in the drawings, they may be round and tubular, such as will float partly submerged in the fused contents of the tank. In order to keep them from shifting, their ends are hollowed out vertically, and corresponding hollows are provided in the sides of the tank or in the projecting parts of those sides, and dowels or keys of fire-brick E E are let down into these hollows through openings *e e* in the roof of the furnace, which are closed after their introduction. The dowels or keys E E are most conveniently made of round form, as shown in the drawings, as pieces in that form fit in any position, and they are a little tapered at their lower ends to render their insertion easy. These dowels, however, might be rectangular, polygonal, or of other form in section, as may be readily understood, the hollow into which they are inserted being made of corresponding form. In all cases they should fit somewhat loosely, so that the bridges D D, which they steady in position, may nevertheless be free to rise or descend, according as the level of the fused material in the tank may vary. From this arrangement it will be seen that the more crude and less perfectly fused and compounded materials at the feeding end of the tank, which float, are prevented from entering that part of the tank where the glass is worked out.

In order to effect a more thorough compounding of the materials, a number of fire-brick rings or short pieces of cylinders F F may be floated in on the fused material at the working-out end. These rings promote a certain amount of vertical circulation of the liquid and render the composition more uniform, and the glass may be worked out through them, as mentioned above.

Having thus described our invention, we claim, and desire to secure by Letters Patent of the United States—

1. The process of melting, fining, and working out glass in a continuous manner from a tank-furnace by means of one or more floating bridges, as and for the purposes described.

2. The process of melting, fining, and working out glass in a continuous manner from a tank-furnace by means of one or more floating bridges and of floating rings, as and for the purposes described.

3. The combination, with a tank glass-furnace, of one or more floating bridges, as and for the purposes described.

4. The combination, with a tank glass-furnace, of one or more floating bridges and floating rings, as and for the purposes described.

C. WILLIAM SIEMENS.
FREDERICK SIEMENS.

Witnesses:
 CHAS. ROCHE,
 THOS. MARCH,
*Both of 2 Waterloo Place, Pall Mall, London, Notary's Clerks.*